F. LJUNGSTRÖM.

STEAM TURBINE.

APPLICATION FILED JULY 23, 1917.

Reissued Sept. 11, 1917.

14,355.

Inventor:
Fredrik Ljungström,
by Albert G. Davis
His Attorney.

UNITED STATES PATENT OFFICE.

FREDRIK LJUNGSTRÖM, OF STOCKHOLM, SWEDEN, ASSIGNOR TO AKTIEBOLAGET LJUNGSTRÖMS ÅNGTURBIN, (MANUFACTURERS,) OF LILJEHOLMEN, STOCKHOLM, SWEDEN.

STEAM-TURBINE.

14,355. Specification of Reissued Letters Patent. Reissued Sept. 11, 1917.

Original No. 1,073,916, dated September 23, 1913, Serial No. 616,651, filed March 24, 1911. Application for reissue filed July 23, 1917. Serial No. 182,348.

*To all whom it may concern:*

Be it known that I, FREDRIK LJUNGSTRÖM, engineer, a subject of the King of Sweden, residing at Stockholm, in the Kingdom of Sweden, have invented certain new and useful Improvements in Steam Turbines, Compressors, or the like: and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The primary object of this invention is to provide a novel form of connecting member for use in connecting together the several parts involved in the construction of steam turbines, compressors, or the like, to accommodate for the expansion of said parts due to the heating thereof by the pressure medium, as well as the contraction in subsequent cooling of these elements. Heretofore the different parts of which devices of this nature consist have been rigidly connected with each other by means of thin yielding connecting members but such construction gives rise to the disadvantage of the necessity of making these connections comparatively long in order to avoid too great strain on said connections. Where turbines employing the usual plurality of vanes are thus constructed with these rigid connecting members, a considerable expense is involved. To eliminate this disadvantage, the connecting members might possibly be made very short and of relatively thick material but this would result in the loss of the yielding action which is so necessary in permitting the relative expansion of the several parts of which the turbine is composed. It is, therefore, contemplated in my invention to provide a member which, when the parts expand or contract, will be capable of turning in its bearings to accommodate for these conditions.

For a full understanding of the present invention reference is to be had to the following description and the accompanying drawings, in which—

Figure 1:
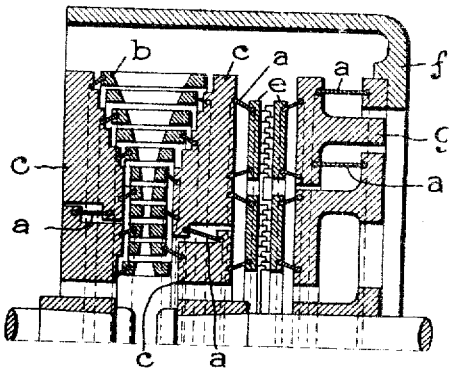
Figure 2:
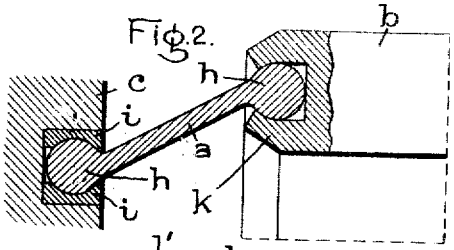
Figure 3:
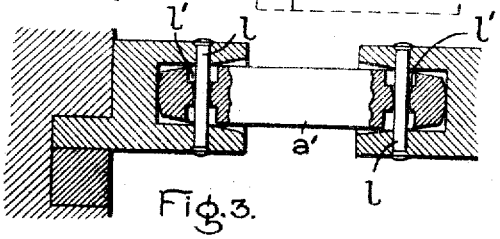

Figure 1 is a longitudinal section showing in part the application of devices constructed in accordance with my invention; Fig. 2 is an enlarged view showing more clearly the manner of securing the members in position to connect the several parts; and Fig. 3 is a modified form of a connecting member in axial section.

Throughout the following detail description and on the several figures of the drawings, similar parts are referred to by like reference characters.

Referring to the drawings and specifically describing my invention, *a* designates the preferred construction of my connecting member arranged between the vane carrying members *b* and the turbine disks *c*. Where the disks consist of a plurality of annular parts, connecting members *a* are located therebetween, as most clearly shown in Fig. 1 of the drawings. These members may also be interposed between the disks *e*, carrying the labyrinth packing, *a'* as well as between the disks *e* and the casing *f* of the turbine. To best serve their purpose the members are also provided between the different annular parts *g* of a disk inserted in the turbine casing or between this disk and any other adjacent part where they are subject to the different amplitude of expansion due to unequal temperatures at their several points.

Specifically describing the connecting members *a*, each comprises a link of suitable length and annular in form having its opposite extremities *h* enlarged or cylindrical in shape. It is preferred that the disks *c* be provided with recesses to receive the rings *i* which form the bearing for the enlarged portion *h* of one extremity of the link member *a*, while the opposite end of said member is adapted to be received in recesses formed in the vane carrying members *b*. The edge portions of said latter recesses, designated *k*, are bent inwardly to securely connect the parts *c* and *b* together. This particular form of connecting member permits the same to be positioned between the several parts which it connects together, in a horizontal or an inclined position, as shown most clearly in Fig. 1.

In Fig. 3 is shown a modified form of member in which the extremities of the body *a'* are provided with transverse openings *l'* therethrough. These extremities are mounted in recesses formed in the parts to be connected together and bolts *l* or similar fastenings are passed through the last mentioned parts and the openings $l'$ in the ends of the connecting member $a'$.

In some instances I find it desirable to make the connecting members $a$ of conical form and in others of cylindrical or drum form when cold, depending upon the character and relation of the parts to be united, both being shown in Fig. 1, partly in full lines and partly in dotted lines.

In a turbine of the character described, it is evident that great differences in temperature exist between the vane carrying members $b$ and the thick disks $c$, not only in heating up the turbine prior to starting, but also when changes of load take place, or when the turbine is alternately operated as a condensing and as a non-condensing unit. These temperature differences are due to the great difference in the rate of heating or cooling of the parts arising from their difference in mass and heating surfaces.

If a difference in temperature exists between the vane carrying members $b$ and the disks $c$ there will be produced in the annular members $a$ a fall of temperature from one extremity to the other, which in a corresponding degree will modify their conicity so that without any appreciable tension they will adapt themselves to the new radial dimensions of the vane carrying members $b$ and also the disks $c$. Owing to the small heat-conducting area offered by the annular members $a$ the conduction of heat within the turbine and through its metal parts is reduced to the greatest possible extent, and in this manner separate concentric temperature zones are formed.

In addition to the changes in diameters of the extremities of the members $a$ due to temperature variations, the centrifugal stresses to which they are subjected when in operation also produce similar changes. In the smaller members nearest the shaft where the steam temperature is high, the change in diameter is due principally to changes in temperature. On the other hand, in the low pressure portion where the steam is colder and the members larger the change is due principally to centrifugal forces.

In addition to supporting the parts one on the other, as previously described, the annular members which are associated with the operating parts also serve as means for transmitting torque from one to the other, as, for example, from the blade rings $b$ to the disks $c$. The members between each disk $c$ and the adjacent packing disk $e$ transmit rotary motion to the latter. Further, said members wherever located serve as means to assist in confining the motive fluid to its proper path and prevent it from escaping without doing useful work.

Having thus described the invention, what is claimed as new is:

1. In a device of the class described, the combination of a turbine comprising a plurality of parts, and connecting means for said parts comprising link members of annular form journaled in said parts and adapted to permit relative expansive and contractive movement of the same when the parts are subjected to unequal temperature.

2. In a device of the class described, the combination of a turbine comprising a plurality of parts having recesses therein, and link members of annular form having enlarged extremities adapted to be received in the recesses aforesaid to yieldingly connect said parts together.

3. In a device of the class described, the combination of a turbine comprising a plurality of parts having recesses therein, ring members mounted in certain of said recesses, the recesses of other parts having their edge portions bent inwardly, and link members of annular form having one extremity mounted in the rings aforesaid and their other extremity mounted in the last mentioned recesses, whereby to permit of relative movement of said parts when subjected to unequal temperature.

4. In a device of the class described, the combination of a turbine comprising a plurality of parts having recesses therein, link members of annular form having extremities adapted to be received in the recesses aforesaid, said extremities having openings therethrough, fastening members passing through the parts, and openings in the extremities of the link members to connect said parts together and permit of relative movement of the parts when subjected to unequal temperature.

In witness whereof, I have hereunto set my hand this 19th day of May, 1917.

FREDRIK LJUNGSTRÖM.

Correction in Letters Patent Reissue No. 14,355.

It is hereby certified that in Reissue Letters Patent No. 14,355, granted September 11, 1917, upon the application of Fredrik Ljungström, of Stockholm, Sweden, for an improvement in "Steam-Turbines," an error appears in the printed specification requiring correction as follows: Page 1, line 74, strike out the reference-letter "*a*" and insert the words and reference-letter *and the disks c*; and that the said Letters Patent should be read with this correction therein that the same may conform to the record of the case in the Patent Office.

Signed and sealed this 20th day of November, A. D., 1917.

[SEAL.]

R. F. WHITEHEAD,

*Acting Commissioner of Patents.*

Cl 253—83.